United States Patent
Koelzer

(10) Patent No.: US 6,785,980 B1
(45) Date of Patent: Sep. 7, 2004

(54) COMPRESSED AIR SUPPLY SYSTEM

(75) Inventor: Robert L. Koelzer, Kearney, MO (US)

(73) Assignee: Haldex Brake Corporation, Kansas City, MO (US)

( * ) Notice: Subject to any disclaimer, the term of this patent is extended or adjusted under 35 U.S.C. 154(b) by 0 days.

(21) Appl. No.: 10/634,286

(22) Filed: Aug. 5, 2003

(51) Int. Cl.$^7$ ................................................. F26B 21/06
(52) U.S. Cl. ............................... 34/81; 34/69; 34/218
(58) Field of Search ............................... 34/61, 69, 72, 34/79, 81, 95, 218; 96/113, 136, 144, 147; 55/DIG. 17

(56) References Cited

U.S. PATENT DOCUMENTS

| | | | | |
|---|---|---|---|---|
| 3,937,622 A | * | 2/1976 | Hewitt et al. | 96/113 |
| 4,714,483 A | * | 12/1987 | Koening et al. | 96/113 |
| 4,764,189 A | * | 8/1988 | Yanagawa et al. | 96/114 |
| 4,892,569 A | | 1/1990 | Kojima | 55/163 |
| 5,186,522 A | | 2/1993 | Spencer | 303/1 |
| 5,209,764 A | * | 5/1993 | Eberling | 96/114 |
| 5,252,034 A | | 10/1993 | Sweet | 417/279 |
| 5,334,230 A | | 8/1994 | Sloka | 55/213 |
| 5,458,676 A | * | 10/1995 | Herbst et al. | 96/109 |
| 5,458,677 A | | 10/1995 | VanderMolen | 96/113 |
| 5,575,541 A | * | 11/1996 | Elamin | 303/1 |
| 6,074,462 A | | 6/2000 | Quinn et al. | 96/113 |
| 6,120,107 A | | 9/2000 | Eslinger | 303/1 |
| 6,391,098 B1 | | 5/2002 | Thomas | 96/111 |
| 6,425,935 B1 | | 7/2002 | Amato | 95/1 |

FOREIGN PATENT DOCUMENTS

WO     WO 01/26947     10/2000

* cited by examiner

*Primary Examiner*—Ira S. Lazarus
*Assistant Examiner*—Kathryn S. O'Malley
(74) *Attorney, Agent, or Firm*—St. Onge Steward Johsnton & Reens LLC

(57) ABSTRACT

A compressed air supply system includes a compressor and an air dryer connected to receive compressed air from the compressor. The dryer includes a desiccant bed through which the compressed air flows to provide dry compressed air, and a blow-through valve operable to connect the desiccant bed to atmosphere. Secondary and primary reservoirs located remotely from the dryer are connected to receive dry compressed air from the dryer. Control components integral with the dryer are provided for controlling a charging operation by controlling air flow from the compressor through the dryer for charging the primary and secondary reservoirs with dry compressed air. The control components also control a purging operation by controlling air flow from the secondary reservoir through the dryer desiccant bed and through the blow-through valve to atmosphere in order to purge the dryer, while maintaining an initial air pressure within the primary reservoir.

16 Claims, 3 Drawing Sheets

COMPRESSED AIR SUPPLY SYSTEM

FIELD OF THE INVENTION

The present invention relates generally to an improved compressed air supply system particularly suited for use in heavy vehicles such as trucks, and more particularly to such a system which incorporates an air dryer with integrated blow-through capabilities.

BACKGROUND OF THE INVENTION

Compressed air systems incorporating air dryers have been used to supply air in heavy vehicle air brake systems for many years. The advantages of clean arid dry air in air brake systems has long been recognized, as moisture entrained in the air brake system may during cold weather operation cause the components of the air brake system to freeze, thus rendering the system inoperable. These prior art air dryers normally include a desiccant material through which the compressed air flows. When the vehicle air compressor has charged the vehicle air reservoirs to a sufficient pressure level, the compressor is unloaded so that the compressor no longer compresses air. When the compressor is unloaded, a signal is transmitted to a purge valve which causes stored compressed air to backflow through the desiccant at a controlled rate to regenerate the desiccant. The air used to regenerate the desiccant can be either from compressed air stored in an integral purge volume within the air dryer or from compressed air stored in a separate reservoir.

Most prior art compressed air systems for heavy vehicle air brake applications use at least three reservoirs. A typical prior art system 110, as shown in FIG. 1, includes a compressor 112 which feeds compressed air to the air dryer 114 which after flowing through the desiccant bed is fed to a remote supply reservoir 116. The supply reservoir 116 is connected to feed compressed air to a primary reservoir 118, a secondary reservoir 120 and sometimes to an auxiliary reservoir 122. The primary 118, secondary 120 and/or auxiliary 122 reservoirs feed pneumatic circuits 124 which can control the air brake system of the vehicle. For protection from loss of air pressure the primary 118, secondary 120 and auxiliary 122 reservoirs each include a check valve 126, 128, 130 in their pneumatic connections to the supply reservoir 116. The check valve 130 of the auxiliary reservoir 122 may also include a pressure protection valve and the supply reservoir 116 may include a safety valve 132 so as to avoid overpressure situations. A pneumatic control line 134 extends from the supply reservoir 116 to an air pressure governor 136 which controls loading and unloading of the air compressor 112 and recharging of the air dryer 114.

This typical prior art design, however, suffers from a number of disadvantages. The system is complex, having four reservoirs, a separate governor, an air dryer, a safety valve, three check valves (one of which also includes a pressure protection valve), and a control line. As such, not only is the system relatively costly to construct initially, but it is relatively costly and time-consuming to maintain. Moreover, the complex system is prone to failure because of the number of components which may malfunction. A simplified design would be far more desirable.

Attempts have been made to obviate at least some of the disadvantages of the prior art systems discussed above. U.S. Pat. No. 6,074,462 ("the '462 patent") represents one such attempt. The '462 patent discloses an air dryer and reservoir system 210 (shown in FIG. 2) for providing compressed air from an air compressor 212 on a heavy motor vehicle which includes an air dryer 214 connected to receive compressed air from the air compressor 212 and a secondary reservoir 216, including an integral purge volume, for storing compressed air which passes through the air dryer 214, with the air dryer 214 and the secondary reservoir 216 being securely attached to a housing to form an integral air dryer reservoir module. A primary reservoir 218 for storing compressed air from the air dryer 214 is located remotely from the air dryer reservoir module. The air dryer 214 has integrated therewith a governor which controls loading and unloading of the air compressor 212. Also integrated with air dryer 214 are two pressure protection valves, one for each of primary reservoir 218 and secondary reservoir 216, which allow for the simultaneous purging of the air dryer 214 using both primary reservoir 218 and secondary reservoir 216.

While the system disclosed in the '462 patent obviates some of the deficiencies of the prior art system shown in FIG. 1 by providing a system which is simplified in some respects, it suffers from disadvantages of its own. Integrating the pressure protection valves associated with primary reservoir 218 and secondary reservoir 216 with the air dryer 214 unnecessarily complicates air dryer 214 and makes servicing and/or replacement of the pressure protection valves more difficult. Moreover, providing both primary reservoir 218 and secondary reservoir 216 with pressure protection valves (whether they be integrated with air dryer 214 or not) such that both reservoirs 218, 216 are used to purge the system complicates the system, and disadvantageously dictates that both reservoirs lose pressure during a purge operation.

What is desired, therefore, is a compressed air supply system which is suitable for use in heavy vehicles such as trucks, which is less complex than known systems, which is less costly to construct initially and less costly and time-consuming to maintain relative to known systems, which is less prone to failure relative to known systems, which allows for simplified servicing and/or replacement of various system components, including pressure protection valves, and which allows at least one reservoir to maintain its initial pressure during a purge operation.

SUMMARY OF THE INVENTION

Accordingly, it is an object of the present invention to provide a compressed air supply system which is suitable for use in heavy vehicles such as trucks.

Another object of the present invention is to provide a compressed air supply system having the above characteristics and which is less complex than known systems.

A further object of the present invention is to provide a compressed air supply system having the above characteristics and which is less costly to construct initially and less costly and time-consuming to maintain relative to known systems.

Still another object of the present invention is to provide a compressed air supply system having the above characteristics and which is less prone to failure relative to known systems.

Yet a further object of the present invention is to provide a compressed air supply system having the above characteristics and which allows for simplified servicing and/or replacement of various system components, including pressure protection valves.

Still yet a further object of the present invention is to provide a compressed air supply system having the above characteristics and which allows at least one reservoir to maintain its initial pressure during a purge operation.

These and other objects of the present invention are achieved by provision of a compressed air supply system for a heavy motor vehicle. In one embodiment, the system includes a compressor for supplying compressed air and an air dryer connected to receive compressed air from the air compressor. The air dryer includes a desiccant bed through which the compressed air flows to provide dry compressed air, and a blow-through valve operable to connect the desiccant bed to atmosphere. A secondary reservoir located remotely from the air dryer is connected to receive dry compressed air from the air dryer, and a primary reservoir located remotely from the air dryer is connected to receive dry compressed air from the air dryer. Control components integral with the air dryer are provided for controlling a charging operation by controlling air flow from the air compressor through the air dryer for charging the primary reservoir and the secondary reservoir with dry compressed air. The control components also control a purging operation by controlling air flow from the secondary reservoir through the air dryer desiccant bed and through the blow-through valve to atmosphere in order to purge the air dryer, while maintaining an initial air pressure within the primary reservoir.

In some embodiments, a one-way check valve is connected between the air dryer and the primary reservoir in order to prevent a loss of pressure within the primary reservoir during the purging operation. In certain of these embodiments, the one-way check valve is located remotely from the air dryer. In certain of these embodiments, the one-way check valve is mounted on the primary reservoir.

In some embodiments, a pressure protection valve is connected between the air dryer and the secondary reservoir in order to prevent a loss of pressure within the secondary reservoir during the charging operation, and to allow for a loss of pressure within the secondary reservoir during the purging operation. In certain of these embodiments, the pressure protection valve is located remotely from the air dryer. In certain of these embodiments, the pressure protection valve is mounted on the secondary reservoir.

In some embodiments, the control components comprise a governor, the governor being integral with the air dryer.

In another embodiment of the present invention, the system includes a compressor for supplying compressed air and an air dryer connected to receive compressed air from the air compressor. The air dryer includes a desiccant bed through which the compressed air flows to provide dry compressed air, and a blow-through valve operable to connect the desiccant bed to atmosphere. A secondary reservoir is connected to receive dry compressed air from the air dryer, and a primary reservoir is connected to receive dry compressed air from the air dryer. Control components are provided for controlling a charging operation by controlling air flow from the air compressor through the air dryer for charging the primary reservoir and the secondary reservoir with dry compressed air. The control components also control a purging operation by controlling air flow from the secondary reservoir through the air dryer desiccant bed and through the blow-through valve to atmosphere in order to purge the air dryer. A one-way check valve is connected between the air dryer and the primary reservoir in order to prevent a loss of pressure within the primary reservoir during the purging operation. A pressure protection valve is connected between the air dryer and the secondary reservoir in order to prevent a loss of pressure within the secondary reservoir during the charging operation, and to allow for a loss of pressure within the secondary reservoir during the purging operation.

In some embodiments, the primary reservoir and the secondary reservoir are located remotely from the air dryer. In some embodiments, the one-way check valve is located remotely from the air dryer. In certain of these embodiments, the one-way check valve is mounted on the primary reservoir. In some embodiments, the pressure protection valve is located remotely from the air dryer. In certain of these embodiments, the pressure protection valve is mounted on the secondary reservoir.

In some embodiments, the control components are integral with the air dryer. In some embodiments, the control components comprise a governor, the governor being integral with the air dryer.

The invention and its particular features and advantages will become more apparent from the following detailed description considered with reference to the accompanying drawings.

DETAILED DESCRIPTION OF AN EMBODIMENT OF THE INVENTION

Figure 3:
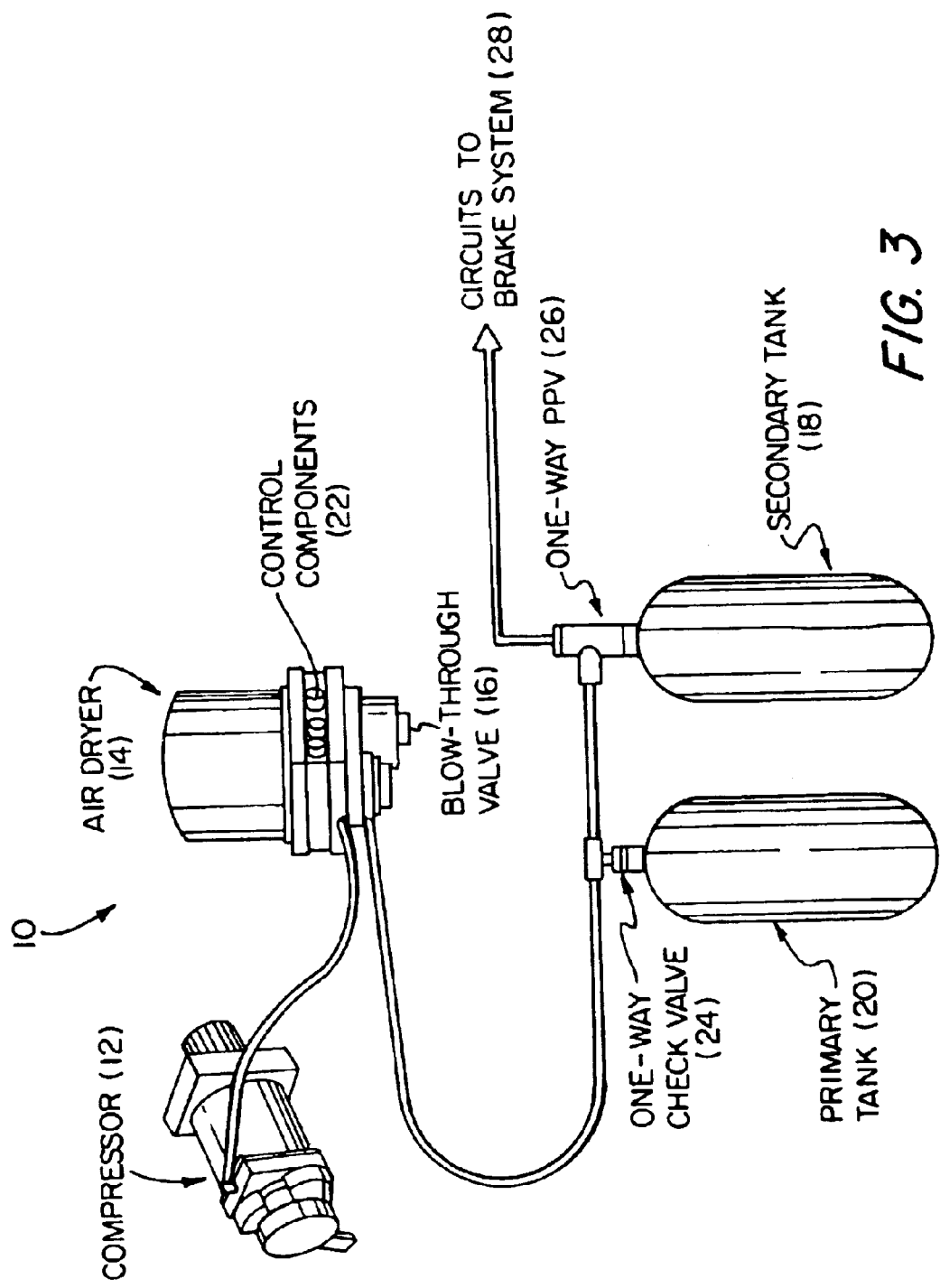
FIG. 3 is a schematic diagram illustrating a compressed air supply system in accordance with one embodiment of the present invention.

Referring now to FIG. 3, a compressed air supply system 10 in accordance with one embodiment of the present invention is shown. Compressed air supply system 10 is particularly suited for use in heavy vehicles such as trucks, and more particularly for use in connection with the braking systems thereof. Compressed air supply system 10 includes a compressor 12 for supplying compressed air and an air dryer 14 connected to receive compressed air from the air compressor 12.

Air compressor 12 is of known design and operates to supply compressed air in accordance with control signals indicative of whether a loaded state or an unloaded state is desired. Because such types of air compressors are well known, a detailed description thereof is not provided herein.

Air dryer 14 is of the type which includes a desiccant bed through which the compressed air flows to provide dry compressed air. As is known, desiccant bed may also provide a cleaning function to remove various contaminants from the compressed air. As such air dryers with desiccant beds are well known, a more detailed description of the design and operation of the desiccant bed is not provided herein. Air dryer 14 also includes a blow-through valve 16 operable to connect the desiccant bed to atmosphere in response to control signals as more fully described below.

A secondary reservoir 18 and a primary reservoir 20 are connected to receive dry compressed air from air dryer 14. Both secondary reservoir 18 and primary reservoir 20 are located remotely from air dryer 14. What is meant by "located remotely" is that secondary reservoir 18 and primary reservoir 20 are separated from air dryer 14 by some space (i.e., neither secondary reservoir 18 nor primary reservoir 20 are integral with or directly connected to air dryer 14).

Control components 22 integral with air dryer 14 are provided for controlling a charging operation by controlling air flow from air compressor 12 through air dryer 14 for charging primary reservoir 20 and secondary reservoir 18 with dry compressed air. Control components 22 also control a purging operation by controlling air flow from secondary reservoir 18 through air dryer 14 desiccant bed and through blow-through valve 16 to atmosphere in order to purge air dryer 14, while maintaining an initial air pressure within primary reservoir 20. Preferably, control components 22 comprise a governor, the governor being integral with air dryer 14.

A one-way check valve 24 is connected between air dryer 14 and primary reservoir 20 in order to prevent a loss of pressure within primary reservoir 20 during the purging operation. Preferably, one-way check valve 24 is located remotely from air dryer 14, and most preferably one-way check valve 24 is mounted on primary reservoir 20.

A pressure protection valve 26 is connected between air dryer 14 and secondary reservoir 18 in order to prevent a loss of pressure within secondary reservoir 18 during the charging operation, and to allow for a loss of pressure within secondary reservoir 18 during the purging operation. Pressure protection valve 26 may be used to feed pneumatic circuits 28 which can control the air brake system of the vehicle, among other vehicle systems. Preferably, pressure protection valve 26 is located remotely from air dryer 14, and most preferably, pressure protection valve 26 is mounted on secondary reservoir 18.

Figure 1:
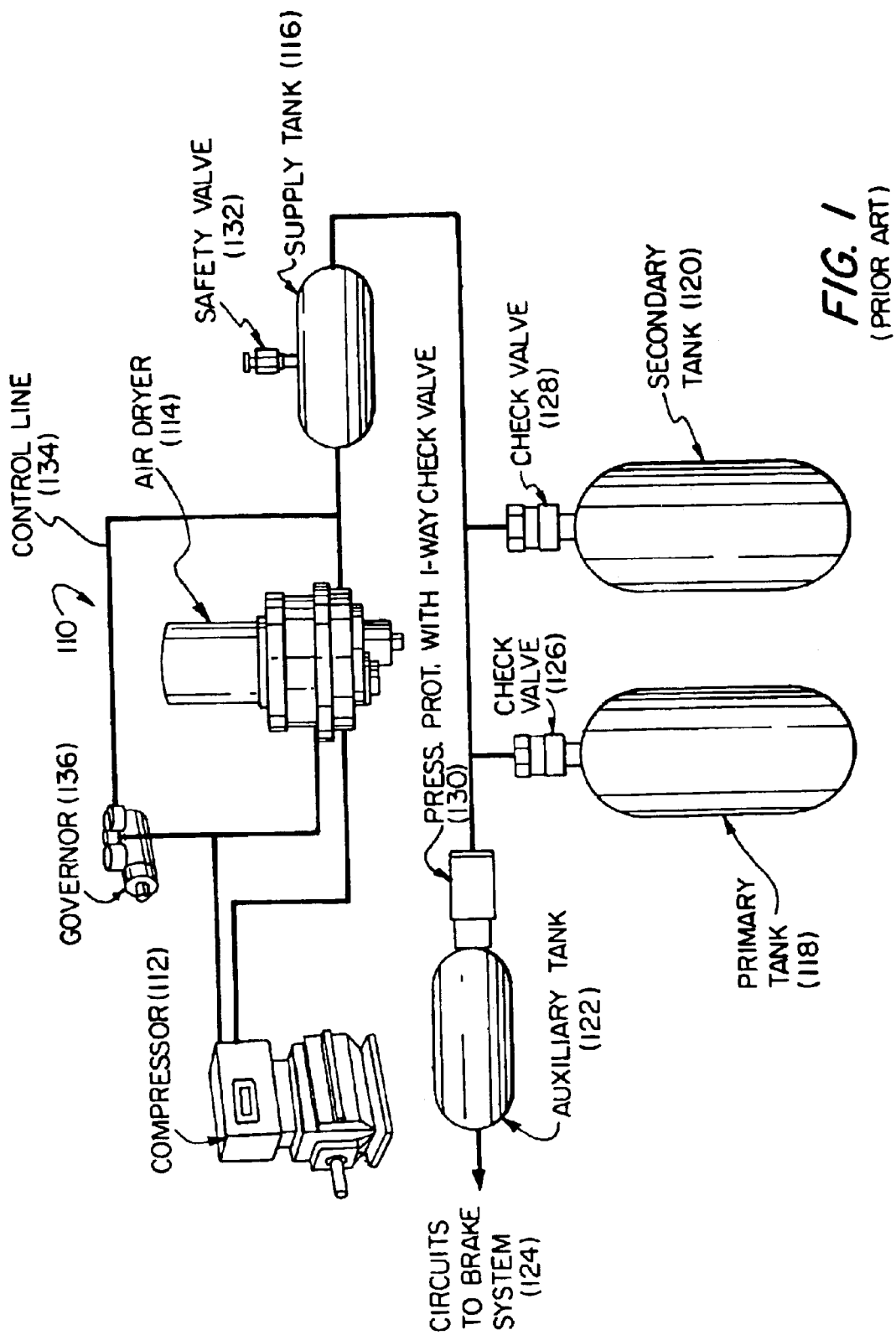
FIG. 1 is a schematic diagram illustrating a typical traditional prior art compressed air system for heavy vehicle air brake applications.

Thus, as can best be seen by comparing FIG. 3 with FIG. 1, while the prior art system 110 shown in FIG. 1 includes numerous components, including four reservoirs, a separate governor, an air dryer, a safety valve, three check valves (one of which also includes a pressure protection valve), and a control line, the system 10 of the present invention, shown in FIG. 3, is much simplified, either integrating or dispensing with many of the components of known system 110 shown in FIG. 1. As such, not only is the system 10 in accordance with the present invention less costly to construct initially, but it is also less costly and time-consuming to maintain, as compared with the known system 110 shown in FIG. 1. Moreover, the simplified system 10 in accordance with the present invention is less prone to failure as compared to the known system 110 shown in FIG. 1 because of the smaller number of components which may malfunction.

Figure 2:
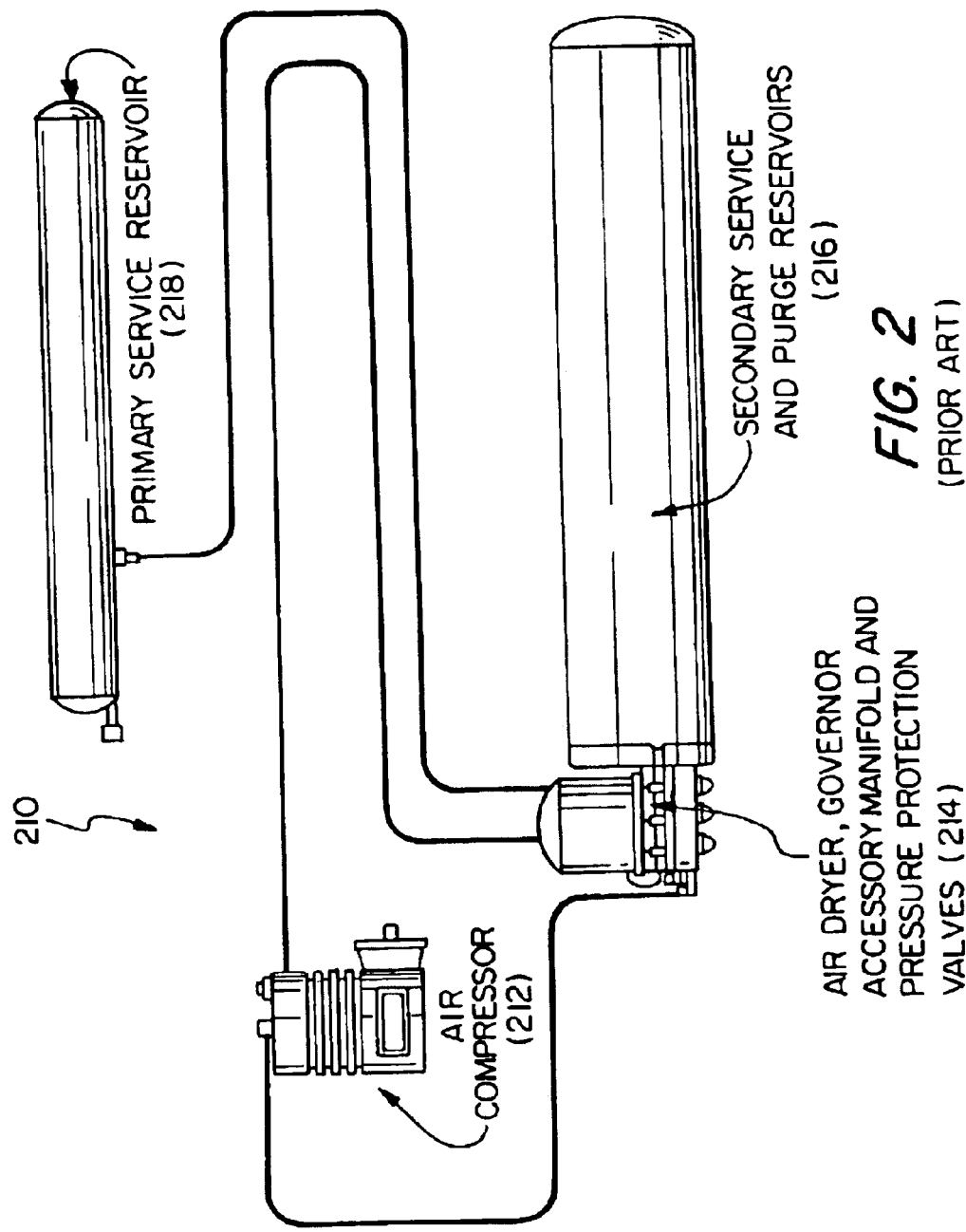
FIG. 2 is a schematic diagram illustrating another prior art compressed air system for heavy vehicle air brake applications which obviates some of the disadvantages of the system illustrated in FIG. 1, but which suffers from a number of disadvantages of its own.

Moreover, as can best be seen by comparing FIG. 3 with FIG. 2, while the prior art system 210 shown in FIG. 2 obviates some of the deficiencies of the prior art system 110 shown in FIG. 1 by providing a system 210 which is simplified in some respects, the system 210 is disadvantageously more complicated that the system 10 in accordance with the present invention in other respects. More specifically, integrating the pressure protection valves associated with primary reservoir 218 and secondary reservoir 216 with the air dryer 214 unnecessarily complicates air dryer 214 and makes servicing and/or replacement of the pressure protection valves more difficult. Moreover, providing both primary reservoir 218 and secondary reservoir 216 with pressure protection valves (whether they be integrated with air dryer 214 or not) such that both reservoirs 218, 216 are used to purge the system complicates the system, and disadvantageously dictates that both reservoirs lose pressure during a purge operation.

The present invention, therefore, provides a compressed air supply system which is suitable for use in heavy vehicles such as trucks, which is less complex than known systems, which is less costly to construct initially and less costly and time-consuming to maintain relative to known systems, which is less prone to failure relative to known systems, which allows for simplified servicing and/or replacement of various system components, including pressure protection valves, and which allows at least one reservoir to maintain its initial pressure during a purge operation.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A compressed air supply system for a heavy motor vehicle, said system comprising:
    a compressor for supplying compressed air;
    an air dryer connected to receive compressed air from said air compressor, said air dryer comprising a desiccant bed through which the compressed air flows to provide dry compressed air, and a blow-through valve operable to connect the desiccant bed to atmosphere;
    a secondary reservoir located remotely from said air dryer and connected to receive dry compressed air from said air dryer;
    a primary reservoir located remotely from said air dryer and connected to receive dry compressed air from said air dryer;
    control components integral with said air dryer for controlling a charging operation by controlling air flow from said air compressor through said air dryer for charging said primary reservoir and said secondary reservoir with dry compressed air; and,
    said control components also controlling a purging operation by controlling air flow from said secondary reservoir through said air dryer desiccant bed and through the blow-through valve to atmosphere in order to purge said air dryer, while maintaining an initial air pressure within said primary reservoir.

2. The system of claim 1 further comprising a one-way check valve connected between said air dryer and said primary reservoir in order to prevent a loss of pressure within said primary reservoir during the purging operation.

3. The system of claim 2 wherein said one-way check valve is located remotely from said air dryer.

4. The system of claim 3 wherein said one-way check valve is mounted on said primary reservoir.

5. The system of claim 1 further comprising a pressure protection valve connected between said air dryer and said secondary reservoir in order to prevent a loss of pressure within said secondary reservoir during the charging operation, and to allow for a loss of pressure within said secondary reservoir during the purging operation.

6. The system of claim 5 wherein said pressure protection valve is located remotely from said air dryer.

7. The system of claim 6 wherein said pressure protection valve is mounted on said secondary reservoir.

8. The system of claim 1 wherein said control components comprise a governor, said governor being integral with said air dryer.

9. A compressed air supply system for a heavy motor vehicle, said system comprising:
    a compressor for supplying compressed air;
    an air dryer connected to receive compressed air from said air compressor, said air dryer comprising a desiccant bed through which the compressed air flows to provide dry compressed air, and a blow-through valve operable to connect the desiccant bed to atmosphere;

a secondary reservoir connected to receive dry compressed air from said air dryer;

a primary reservoir connected to receive dry compressed air from said air dryer;

control components for controlling a charging operation by controlling air flow from said air compressor through said air dryer for charging said primary reservoir and said secondary reservoir with dry compressed air;

said control components also controlling a purging operation by controlling air flow from said secondary reservoir through said air dryer desiccant bed and through the blow-through valve to atmosphere in order to purge said air dryer;

a one-way check valve connected between said air dryer and said primary reservoir in order to prevent a loss of pressure within said primary reservoir during the purging operation; and a pressure protection valve connected between said air dryer and said secondary reservoir in order to prevent a loss of pressure within said secondary reservoir during the charging operation, and to allow for a loss of pressure within said secondary reservoir during the purging operation.

10. The system of claim 9 wherein said primary reservoir and said secondary reservoir are located remotely from said air dryer.

11. The system of claim 9 wherein said one-way check valve is located remotely from said air dryer.

12. The system of claim 11 wherein said one-way check valve is mounted on said primary reservoir.

13. The system of claim 9 wherein said pressure protection valve is located remotely from said air dryer.

14. The system of claim 13 wherein said pressure protection valve is mounted on said secondary reservoir.

15. The system of claim 9 wherein said control components are integral with said air dryer.

16. The system of claim 9 wherein said control components comprise a governor, said governor being integral with said air dryer.

* * * * *